US007660007B2

(12) United States Patent
Uchida

(10) Patent No.: US 7,660,007 B2
(45) Date of Patent: Feb. 9, 2010

(54) PRINT MANAGEMENT-RELATING TECHNIQUE

(75) Inventor: Yasuhiko Uchida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1075 days.

(21) Appl. No.: 10/922,216

(22) Filed: Aug. 18, 2004

(65) Prior Publication Data
US 2005/0231754 A1 Oct. 20, 2005

(30) Foreign Application Priority Data
Aug. 21, 2003 (JP) ............................. 2003-297750

(51) Int. Cl.
G06F 3/12 (2006.01)
G06K 15/00 (2006.01)
G06K 3/12 (2006.01)
G06F 7/04 (2006.01)

(52) U.S. Cl. .................... 358/1.15; 358/1.16; 358/1.13; 726/26; 715/709

(58) Field of Classification Search ................ 358/1.15, 358/1.13, 1.18, 1.12, 1.6, 1.14, 1.1; 707/104.1; 370/216; 726/26; 715/502, 709
See application file for complete search history.

(56) References Cited
U.S. PATENT DOCUMENTS
7,173,722 B1 * 2/2007 Lapstun et al. ............. 358/1.15
7,350,236 B1 * 3/2008 Silverbrook et al. .......... 726/26

FOREIGN PATENT DOCUMENTS
JP 2003-131853 5/2003

OTHER PUBLICATIONS
Abstract of Japanese Patent Publication 2003-131853, Pub. Date: May 9, 2003, Patent Abstracts of Japan.

* cited by examiner

Primary Examiner—King Y Poon
Assistant Examiner—Neil R McLean
(74) Attorney, Agent, or Firm—Martine Penilla & Gencarella, LLP

(57) ABSTRACT

A print management device of the invention receives thumbnail images corresponding to object images of a print service and e-mail addresses of acquaintances specified by a user, from a printing apparatus, in response to the user's request. The print management device sends an e-mail including an URL for browsing the thumbnail images and a print permission password to each of the specified acquaintances. Each of the specified acquaintances may thus browse thumbnail images with the print permission password and provide an order for printing original images corresponding to selected thumbnail images. The print management device notifies the user of order information with regard to the order for printing the original images, asks the user to permit or deny execution of a print service with regard to the order, and sends the order for the print service to a photo studio for execution of the print service, in response to permission for the order.

12 Claims, 19 Drawing Sheets

Fig. 2

| Studio ID |
|---|
| Password |
| Studio Name |
| E-Mail Address |
| Printer ID |
| ... |

Fig. 3

| User OD |
|---|
| Password |
| E-Mail Address |
| ... |

Fig. 4

| Registration Management ID | | |
|---|---|---|
| Studio ID | | |
| User ID | | |
| Payer Responsible | | |
| Expiration Date of Reception | | |
| Print Permission Password | | |
| Printing Conditions | Paper Type | |
| | Paper Size | |
| | Ink Type | |
| Image Information | Image D1 | |
| | Image D2 | |
| | ... | |
| Receiver Information | 1 | Name 1 |
| | | E-Mail Address 1 |
| | | Receiver ID 1 |
| | 2 | Name 2 |
| | | E-Mail Address 2 |
| | | Receiver ID 2 |
| | ... | |
| Order Information | 1 | Order ID 1 |
| | | Permission/Denial Information |
| | 2 | Order ID 2 |
| | | Permission/Denial Information |
| | ... | |
| Charge | | |

Fig. 5

| |
|---|
| Order ID |
| Receiver ID |
| Receiver Name |
| Receiver Postal Address |
| Receiver Telephone Number |
| Receiver Birthday |
| Receiver E-Mail Address |
| Size |

| Printing Image Information | 1 | Image ID 1 |
| --- | --- | --- |
| | | Number of Copies 1 |
| | 2 | Image ID 2 |
| | | Number of Copies 2 |
| | ... | |

| |
|---|
| Permission Denial Information |
| Charge |
| Processing Status |
| ... |

Fig. 6

| | | | |
|---|---|---|---|
| A4 | Dye Ink | Luster | ¥**** |
| | | Matte | ¥**** |
| | Dye Ink | Luster | ¥**** |
| | | Matte | ¥**** |
| A5 | Dye Ink | Luster | ¥**** |
| | | Matte | ¥**** |
| | Dye Ink | Luster | ¥**** |
| | | Matte | ¥**** |
| ... | | | |

Fig. 8

| Studio ID | | |
|---|---|---|
| User ID | | |
| Password (user) | | |
| E-Mail Address (User) | | |
| Payer Responsible | | |
| Expiration Date of Reception | | |
| Print Permission Password | | |
| Printing Conditions | Paper Type | |
| | Paper Size | |
| | Ink Type | |
| Image Information | Image ID 1 | |
| | Image ID 2 | |
| | ... | |
| Receiver Information | 1 | Name |
| | | E-Mail Address |
| | 2 | Name |
| | | E-Mail Address |
| | ... | |

Fig. 9

Web Album Entry Form

User ID :

Password :

E-Mail Address :

Birthday :

Payer Responsible : ○User    ○Receivers

Expiration Date of Reception :

Permission PW :

Paper Type :      ○Luster  ○Matte

Paper Size :   [A4 ▽]

Ink Type :        ○Dye     ○Pigment

Image Folder :

Receiver 1 Name :

E-Mail Address :

Receiver 2 Name :

E-Mail Address :

[Add to Receivers]                [End of Entry]

Fig. 13

Print Service

Please fill in the following boxes for delivery of resulting prints and identification and click the 'Next' button.

Name :

Postal Address :

Telephone Number :

Birthday :

E-Mail Address :

Back | Next

Fig. 15

| Receiver ID |||
|---|---|---|
| Receiver Name |||
| Receiver Postal Address |||
| Receiver Telephone Number |||
| Receiver Birthday |||
| Receiver E-Mail Address |||
| Size |||
| Printing Image Information | 1 | Image ID 1 |
| | | Number of Copies 1 |
| | 2 | Image ID 2 |
| | | Number of Copies 2 |
| | ... ||
| Charge |||

PRINT MANAGEMENT-RELATING TECHNIQUE

BACKGROUND OF THE INVENTION

1. Field of the Invention

The present invention relates to a print management-relating technique, specifically to a print management device that manages printing of an image. The invention also relates to a corresponding method that causes a computer including an information storage module that stores information and an information transmitter receiver module that sends and receives information via a network, to manage printing of an image, and a storage medium that stores a corresponding program which is installable in a computer.

2. Description of the Prior Art

One proposed print management device allows only specific persons in a preset range to see uploaded images and download the uploaded images (see, for example, Japanese Patent Laid-Open Gazette No. 2003-131853). This prior art print management device allocates a password to browsing, downloading, and printing of each album page exclusive for each registered user including multiple images uploaded from a computer of the registered user and, in response to only successful authentication of the password, gives permission to browse, download, and print the corresponding album page. This print management device receives an order for printing selected images in the browsed album page at a print center and delivering resulting prints, in response to a request from one of the specific persons with successful authentication of the password.

SUMMARY OF THE INVENTION

The prior art print management device gives permission to download the selected images to only the specific persons in the preset range, but is not capable of managing the downloaded images. The downloaded images may thus be delivered to the general public or may be printed may times to give a large number of copies, against the intention of the registered user. The downloaded images may be printed under printing conditions, for example, settings of printing paper type, printing paper size, and ink type, against the intention of the registered user.

The object of the present invention is to provide a print management-relating technique that prevents the general public from accessing an image against the user's intention. The object of the inventions is further to provide a print management-relating technique that restrains the potential trouble of making a large number of prints of an image against the user's intention, or making prints under printing conditions against the user's intention.

In order to achieve at least part of the above object, the present invention is constructed as follows.

The present invention is directed to a print management device that manages printing of an image, and includes an information storage module that stores information and an information transmitter receiver module that transmits and receives information via a network. The print management device of the invention further includes: a registration information reception control module that controls the information transmitter receiver module to receive registration information from a computer connecting with the network and stores the received registration information into the information storage module, where the registration information includes user identification information for identifying a user, user contact information regarding a contact point of the user, at least one thumbnail image, printing apparatus contact information regarding a contact point of a printing apparatus, which stores an original image corresponding to each of the at least one thumbnail image and is capable of printing the original image, and specific person contact information regarding a contact point of a specific person who receives permission to print the original image corresponding to each of the at least one thumbnail image; a specific person-only information delivery control module that controls the information transmitter receiver module to transmit specific person-only information to the contact point of the specific person specified according to the specific person contact information included in the registration information stored at a preset timing in the information storage module, where the specific person-only information includes address information that is used by the specific person via a computer to browse the at least one thumbnail image included in the registration information, and permission information that permits the specific person to browse the at least one thumbnail image and print the original image corresponding to each of the at least one thumbnail image; a thumbnail image transmission control module that receives a browsing request of at least one thumbnail image in relation to the transmitted address information and permission information from another computer connecting with the network, reads the at least one thumbnail image in relation to the address information from the information storage module, and controls the information transmitter receiver module to transmit the at least one read-out thumbnail image, which is to be displayed on the another computer; an order information reception control module that controls the information transmitter receiver module to receive print order information and stores the received print order information in relation to corresponding registration information into the information storage module, where the print order information includes selection information regarding an object image to be printed, which is selected among the at least one transmitted thumbnail image and input from the another computer, and specific person identification information for identifying the specific person; an order information delivery control module that reads the registration information stored at the preset timing in the information storage module and the print order information in relation to the registration information from the information storage module, and controls the information transmitter receiver module to transmit the read-out print order information to the contact point of the user specified by the user contact information included in the read-out registration information; a permission/denial information reception control module that controls the information transmitter receiver module to receive permission/denial information regarding permission or denial of a print order with respect to the transmitted print order information from the user's computer connecting with the network, and stores the received permission/denial information in relation to the corresponding registration information into the information storage module; and an order processing module that reads the registration information stored at the preset timing in the information storage module, as well as the print order information and the permission/denial information in relation to the registration information, from the information storage module, and controls the information transmitter receiver module, in response to setting of print permission in the read-out permission/denial information, to transmit the print order information to the contact point of the printing apparatus specified by the printing apparatus contact information included in the registration information, while controlling the information transmitter receiver module, in response to setting of print denial in the read-out permission/ denial information, to transmit print denial information including denial of the print order to the contact point of the specific person identified by the specific person identification information included in the print order information.

The print management device of the invention sends the address information for displaying the thumbnail image to only the contact point of the specific person specified in the specific person contact information included in the registration information. This arrangement effectively prevents the general public from accessing the thumbnail image. Transmission of the permission information is required to browse the thumbnail image. Such requirement restrains the general public from accessing the thumbnail image with a high accuracy. The user is allowed to give permission or denial of each print order. This desirably restrains printing of the original image against the user's intention. The printing apparatus specified by the printing apparatus contact information included in the registration information is used to print the original image, while the original image is not downloaded to the print management device. This arrangement effectively restrains the potential trouble of making a large number of unauthorized prints of the downloaded original image, against the user's intention.

In one preferable embodiment of the invention, the registration information reception control module receives payment responsible information regarding a payer responsible for printing of the object image, as part of the registration information, and the print management device further includes an accounting execution module that executes accounting for printing of the object image, based on the print order information and the payment responsible information. In one preferable application of the print management device in this embodiment, the payment responsible information is set in response to selection of either of the user and the specific person with the print order to pay for printing the object image. The accounting execution module, in response to setting of the user to the payer responsible in the payment responsible information, sums up a total charge payable by the user and adjusts an account for the user at a predetermined timing, while in response to setting of the specific person with the print order to the payer responsible in the payment responsible information, adjusting an account for the specific person, who is identified by the specific person identification information included in the print order information with setting of print permission in the permission/denial information received by the permission/denial information reception control module. In another preferable application of the print management device in the above embodiment, the accounting execution module controls the information transmitter receiver module to transmit a result of the accounting to a contact point of an object person selected as the payer responsible. In another preferable application of the print management device in the above embodiment, the thumbnail image transmission control module reads the payment responsible information from the information storage module and transmits the read-out payment responsible information, together with the at least one thumbnail image. In still another preferable application, the order information reception control module receives printing condition information including a required number of copies and a print size with regard to the object image to be printed, as part of the print order information. The accounting execution module executes accounting, based on the printing condition information.

In another preferable embodiment of the print management device of the invention, the registration information reception control module receives printing condition information including at least one of a printing paper size, a printing paper type, and an ink type used for printing the original image, as part of the registration information, and the thumbnail image transmission control module reads the printing condition information from the information storage module and transmits the read-out printing condition information, together with the at least one thumbnail image, to be displayed on the another computer. In one preferable application of the print management device in this embodiment, the registration information reception control module receives the printing condition information including multiple options of the printing paper size used for printing the original image, as part of the registration information. The thumbnail image transmission control module reads the printing condition information from the information storage module and transmits the read-out printing condition information, together with the at least one thumbnail image, to be displayed on the another computer, and the order information reception control module receives a selected option of the printing paper size used for printing the original image, as part of the print order information.

In the print management device of the invention, the specific person contact information may be an e-mail address of the specific person, and the specific person-only information delivery control module may create an e-mail describing the specific person-only information and sends the e-mail. The user contact information may also be an e-mail address of the user, and the order information delivery control module may create an e-mail describing the read-out print order information and sends the e-mail.

In still another preferable embodiment of the print management device of the invention, the registration information reception control module receives at least one display image, which corresponds to the at least one thumbnail image and has a greater size than a size of the thumbnail image, as part of the registration information. The thumbnail image transmission control module, in response to selection of a desired thumbnail image on the another computer, reads a display image corresponding to the selected thumbnail image from the information storage module, and controls the information transmitter receiver module to transmit the display image, which is to be displayed on the another computer.

In still another preferable embodiment of the print management device of the invention, the order information reception control module receives information including at least one of postal address, birthday, and telephone number, in addition to name of the specific person as the specific person identification information and stores the received specific person identification information into the information storage module.

The print management-relating technique of the present invention is applicable to a print management method in relation to the print management device described above. The technique is also applicable to a corresponding program installable in a computer, as well as a storage medium which stores the program therein.

BRIEF DESCRIPTION OF THE DRAWINGS

FIG. 2 shows an example of data structure of studio information;

FIG. 3 shows an example of data structure of user information;

FIG. 4 shows an example of data structure of registration management information;

FIG. 5 shows an example of data structure of order information;

FIG. 6 shows an example of a charge table stored as the accounting information;

FIG. 8 shows an example of data structure of registration information;

FIG. 9 shows an example of an entry form to enter the registration information;

FIG. 13 shows an example of an identification entry window;

FIG. 15 shows an example of data structure of order entry information;

DESCRIPTION OF THE PREFERRED EMBODIMENTS

Figure 1:
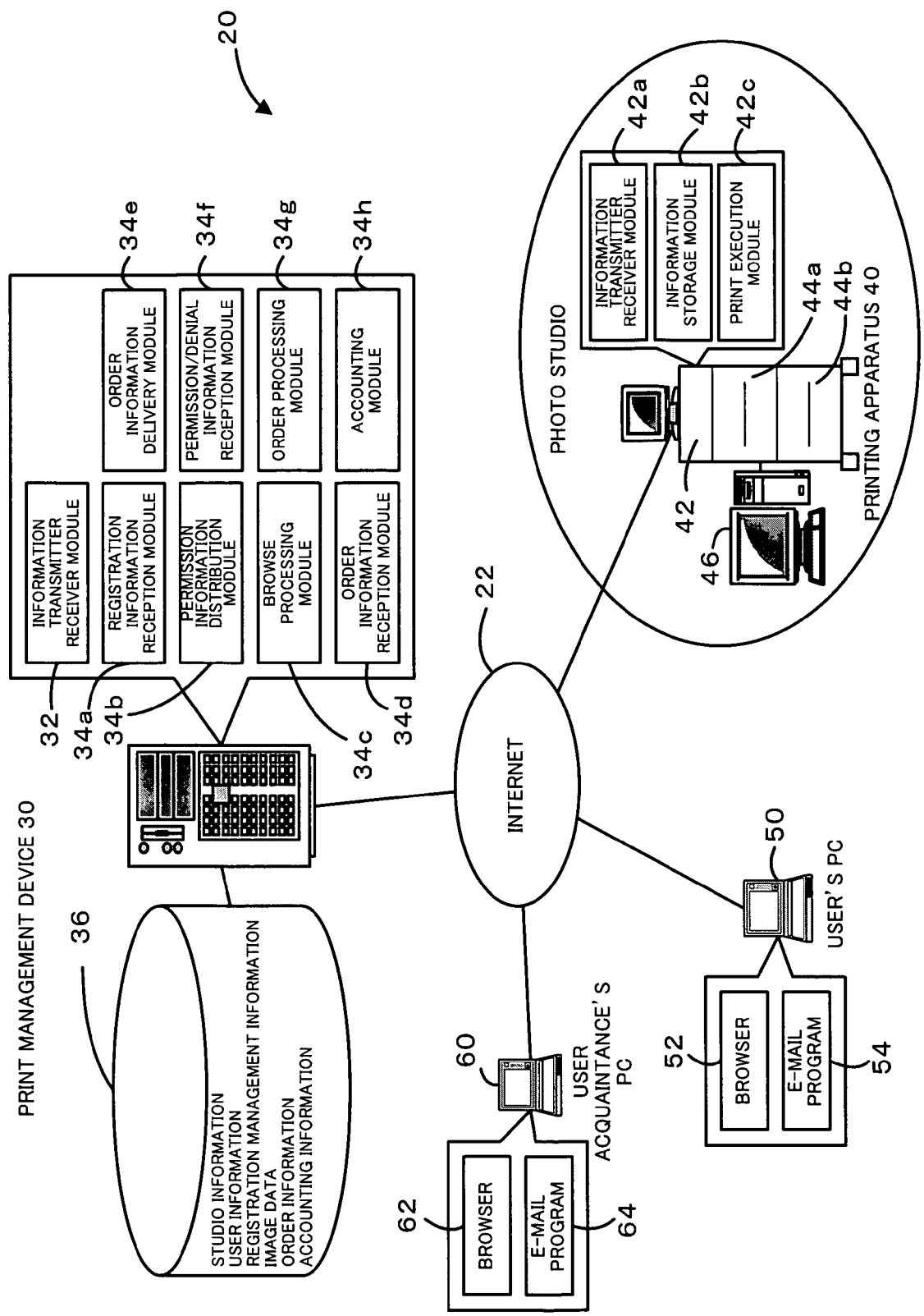
FIG. 1 schematically illustrates the configuration of a printing system 20 in one embodiment of the invention.

One mode of carrying out the invention is discussed below as a preferred embodiment with reference to the accompanied drawings. FIG. 1 schematically illustrates the configuration of a printing system 20 including a print management device 30 in one embodiment of the invention. The print management device 30 of this embodiment is constructed as a Web server that is connected via the Internet 22 to a printing apparatus 40 installed at a photo studio, as well as a user's computer 50 and a user acquaintance's computer 60. The print management device 30 includes an information transmitter receiver module 32 that sends and receives information via the Internet 22, a registration information reception module 34a that controls the information transmitter receiver module 32 to receive registration information from the printing apparatus 40 at the photo studio to execute a print service of multiple images in response to the user's request, and a permission information distribution module 34b that distributes permission information with regard to the print service and an address (URL) for displaying a list of the multiple images to a delivery destination included in the received registration information. The print management device 30 also includes a browse processing module 34c that executes browse processing of an image in response to a browse request of a selected image from the user's acquaintance via the Internet 22, an order information reception module 34d that receives order information with regard to the print service of the selected image from the user's acquaintance after browse of the selected image, and an order information delivery module 34e that delivers the order information to the user for determination of either permission to or denial of execution of the print service based on the specifications of the received order information. The print management device 30 further includes a permission/denial information reception module 34f that receives the user's permission/denial information in response to the delivered order information, an order processing module 34g that processes the order information with the user's permission, an accounting module 34h that calculates the charge with regard to the order information with the user's permission and prepares a payment advice of total charge to the user, and a hard disk unit 36 that stores a large number of image data, as well as diverse pieces of information including studio information, user information, registration management information, order information, and accounting information in the form of databases. The registration information reception module 34a, the permission information distribution module 34b, the browse processing module 34c, the order information reception module 34d, the order information delivery module 34e, the permission/denial information reception module 34f, the order processing module 34g, and the accounting module 34h are actualized by software integrated with hardware like a CPU for executing the software.

The printing apparatus 40 includes a general computer 42 and two high-performance color inkjet printers 44a and 44b. The computer 42 includes an information transmitter receiver module 42a that sends and receives information via the Internet 22, an information storage module 42b that stores information, for example, a hard disk unit, and a print execution module 42c that manages the schedule to specify which of the two color ink jet printers 44a and 44b is to be used for each received print job and executes the received print job according to the schedule. The printing apparatus 40 is connected to multiple client computers 46 via a LAN in the photo studio. For convenience of illustration, the printing system 20 shown in FIG. 1 includes only one printing apparatus 40 installed at one photo studio. The printing system 20 may, however, include multiple printing apparatuses 40 installed at multiple photo studios.

The user's computer 50 and the user acquaintance's computer 60 are both general computers, in which browsers 52 and 62 and e-mail programs 54 and 64 for communication via the Internet 22 are respectively installed. For convenience of illustration, the printing system 20 shown in FIG. 1 includes only one user's computer 50 and only one user acquaintance's computer 60. The printing system 20, however, actually includes multiple users' computers 50 and multiple user acquaintances' computers 60.

For the simplicity of explanation, the diverse pieces of information registered in the form of databases in the hard disk unit 36 are described, prior to description of processing executed by the print management device 30 of the embodiment. FIG. 2 shows one example of data structure of studio information. In this illustrated example, the studio information includes a studio ID for identifying each photo studio, a password for authentication of an access from the printing apparatus 40 at the photo studio, the name of the photo studio (studio name), the e-mail address of the photo studio, and a printer ID for identifying each printer included in the printing apparatus 40. FIG. 3 shows one example of data structure of user information. In the illustrated example, the user information includes a user ID for identifying each user, a password for authentication of the user's access, and the user's e-mail address.

FIG. 4 shows one example of data structure of registration management information. In the illustrated example, the registration management information includes a registration management ID for identifying the registration management information, the studio ID, the user ID, a payer responsible specifying which of the user and a receiver with an order for a print service pays for the print service, an expiration date of reception of the print service, a print permission password for permission to browse of a selected image or to an order for the print service, printing conditions including paper type, paper size, and ink type, image information including multiple image IDs, receiver information including the name and the e-mail address of the receiver and a receiver ID for identifying the receiver, and order information including an order ID for identifying each order for the print service and the user's permission or denial with regard to each order for the print service.

FIG. 5 shows one example of data structure of order information. In the illustrated example, the order information includes an order ID for identifying the order information, an ID of the receiver with an order for a print service (receiver ID), the name, the postal address, the telephone number, the birthday, and the e-mail address of the receiver, a print size, printing image information including an ID of each object image in the order for the print service (image ID) and the number of copies of the object image, the user's permission/denial information with respect to the print service, charge for the print service, and a processing status of the print service.

FIG. 6 shows one example of a charge table stored as the accounting information in the hard disk unit 36. In this illustrated example, the charge table includes settings of charges for respective combinations of paper size, ink type, and paper type.

Figure 7:
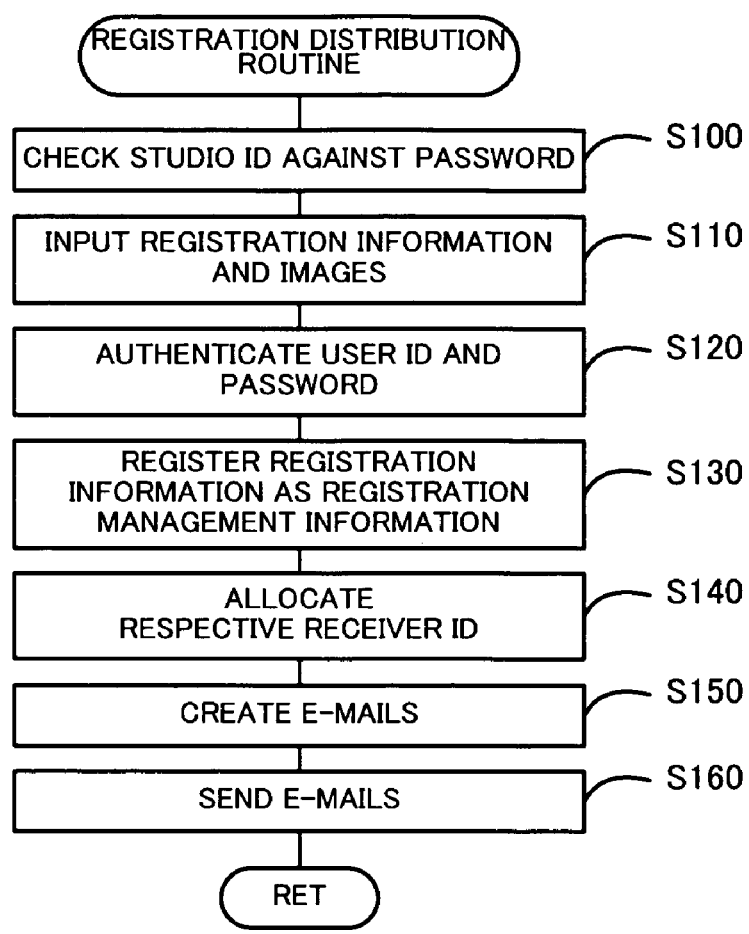
FIG. 7 is a flowchart showing a registration distribution routine.

The following describes the operations of the print management device 30 of the embodiment constructed as discussed above. FIG. 7 is a flowchart showing a registration distribution routine executed when a non-illustrated CPU in the print management device 30 of the embodiment functions as the registration information reception module 34a and the permission information distribution module 34b. The registration distribution routine is executed, in response to a registration request of the registration information from the printing apparatus 40 at the photo studio. The registration distribution routine first checks a studio ID against a password, both sent from the printing apparatus 40 (step S100). A concrete procedure retrieves information corresponding to a studio ID input and sent from the printing apparatus 40 in the studio information stored as a database in the hard disk unit 36 and compares a password input and sent from the printing apparatus 40 with a password included in the retrieved information.

After checkup of the studio ID against the password, the routine inputs registration information and images sent from the printing apparatus 40 (step S110). FIG. 8 shows one example of data structure of the input registration information. In this embodiment, the registration information has similar data structure to that of the registration management information stored in the hard disk unit 36. The registration information includes the studio ID, the user ID, a password of the user, the user's e-mail address, the payer responsible, the expiration date of reception of the print service, the print permission password, the printing conditions, image information including IDs of images to be registered (image IDs), and receiver information including the name and the e-mail address of each receiver as a target of the print service. The specifications of the registration information are entered, for example, in an entry form displayed on the printing apparatus 40 as shown in FIG. 9. Here the terminology 'each receiver as a target of the print service' means the user's acquaintance or any other person pointed by the user for browsing or printing of object images. The user brings desired object images to the photo studio or takes object images at the photo studio, where the user desires the acquaintances to browse or access a print service of the object images. The user then enters registration information with specification of the acquaintances as receivers on the printing apparatus 40 at the photo studio, and sends the entered registration information to the print management device 30. The input images are thumbnail images corresponding to object images of a print service and display images having a greater size than the thumbnail images. An image ID is allocated to each thumbnail image and corresponding display image prepared by the printing apparatus 40. More specifically, the printing apparatus 40 creates a thumbnail image and a display image corresponding to each selected object image, allocates an image ID to the thumbnail image and display image, generates registration information including the allocated image ID, and sends the registration information, the thumbnail image, and the display image to the print management device 30. The print management device 30 stores the received thumbnail images and display images as image data with the allocated image IDs in the hard disk unit 36 in such a manner that the thumbnail images and the display images are retrievable with the image IDs.

After input of the registration information and the images, the routine authenticates the user ID and the password included in the registration information with reference to the user information stored as the database in the hard disk unit 36 (step S120). In the case of successful authentication, the routine registers the entered specifications of the registration information as the registration management information into the database of the hard disk unit 36 (step S130), and allocates a receiver ID for identification of each receiver registered in the registration management information (step S140). The data of the user information except the user ID in the registration information are not registered into the database.

Figure 10:
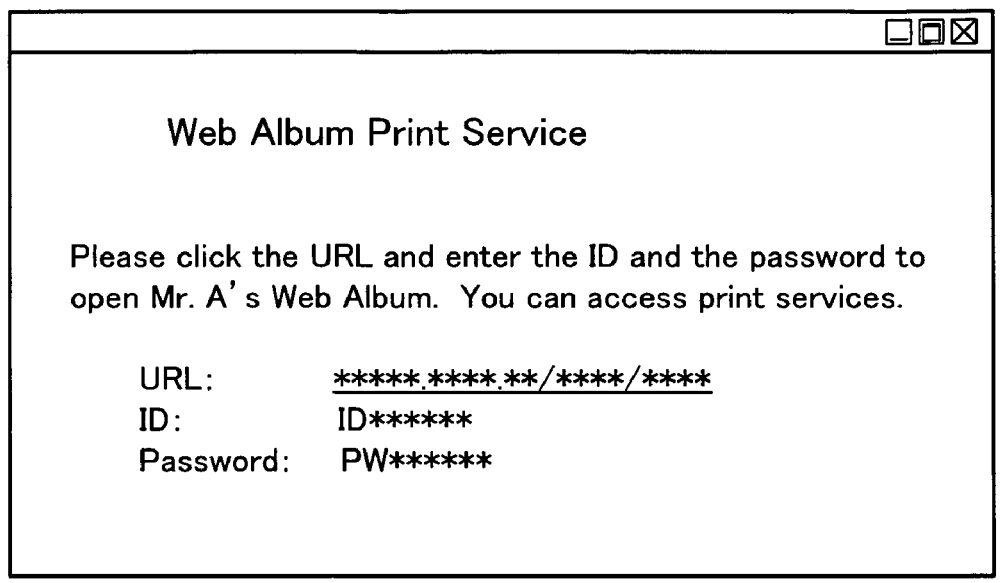
FIG. 10 shows an example of an e-mail sent to a receiver.

On completed registration of the registration management information, the routine prepares e-mails, which include an address (URL) of a page for browsing the images input with the registration information, each allocated receiver ID, and the print permission password (step S150), and sends the prepared e-mails to the respective receivers with the e-mail addresses included in the receiver information of the registered registration management information (step S160). The registration distribution routine is here terminated. FIG. 10 shows one example of the e-mail. A URL included in the e-mail of FIG. 10 has a link to a page that opens to display a list of images (thumbnail images) input with the registration information and stored in the hard disk unit 36, in response to a mouse click of the URL by each acquaintance (receiver) who has received this e-mail.

Figure 11:
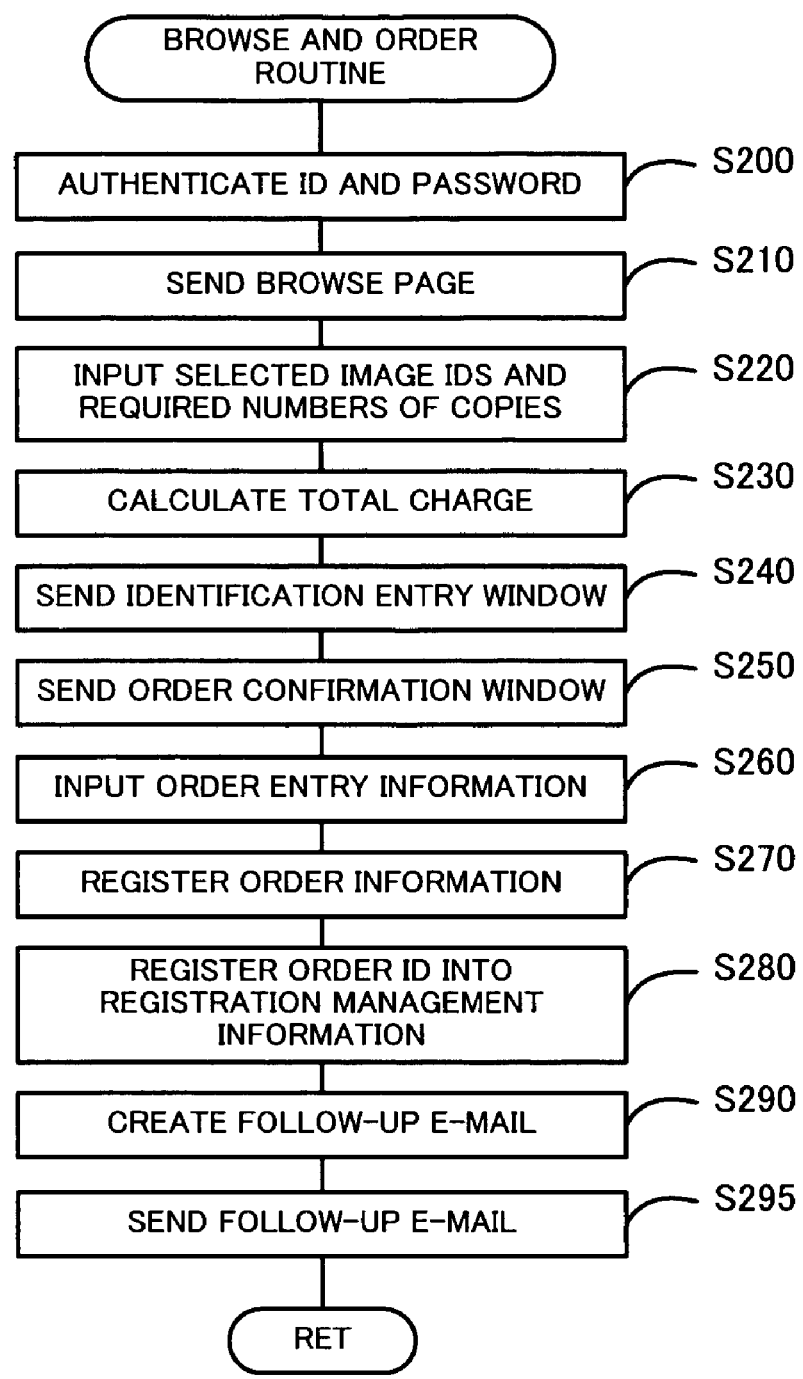
FIG. 11 is a flowchart showing a browse and order routine.

The following describes a series of processing executed in response to a click of the URL included in the e-mail by each acquaintance (receiver) receiving an e-mail to browse images and access a print service. FIG. 11 is a flowchart showing a browse and order routine executed when the non-illustrated CPU in the print management device 30 of the embodiment functions as the browse processing module 34c, the order information reception module 34d, and the order information delivery module 34e. The browse and order routine first authenticates an ID and a password (step S200). A concrete procedure of the authentication sends and opens a window (not shown) for entry of the ID and the password to and on the acquaintance's (receiver's) computer 60, in response to a click of the URL included in the e-mail by the acquaintance (receiver). The procedure then receives entries of the ID and the password, which are included in the e-mail and are entered in the window open on the computer 60 by the acquaintance (receiver), retrieves the registration management information with the received ID as the receiver ID, and compares the received password with the print permission password included in the retrieved registration management information.

Figure 12:
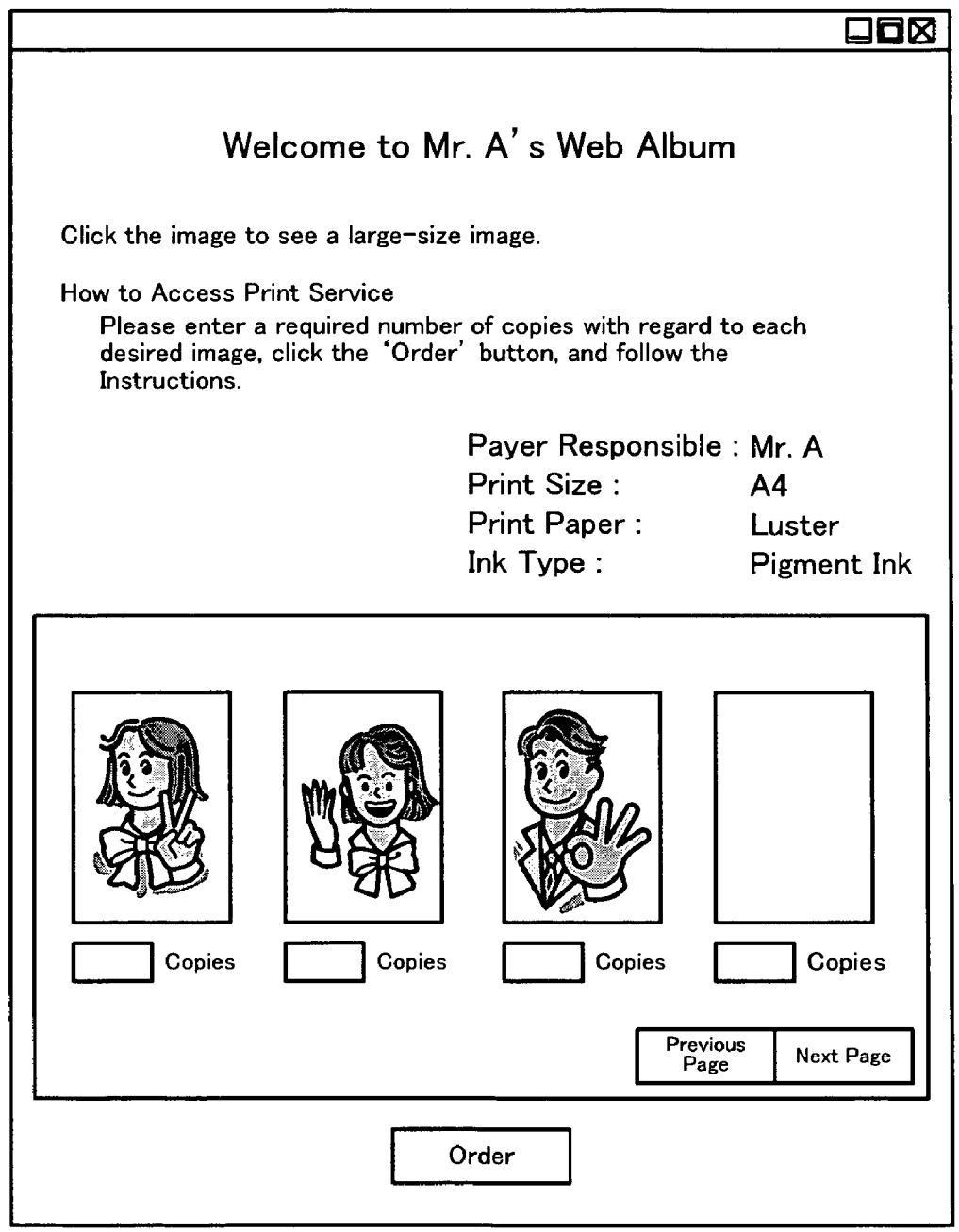
FIG. 12 shows an example of the browser page.

After authentication of the ID and the password, the routine sends and opens a browser page, which includes a list of thumbnail images with allocated image IDs included in the image information of the retrieved registration management information, as well as the payer responsible and the printing conditions included in the registration management information, to and on the acquaintance's (receiver's) computer 60 (step S210). FIG. 12 shows one example of the browser page. The browser page of FIG. 12 is designed to be also used as an order page of the print service. The browser page accordingly has an input box for entry of a required number of copies immediately below each displayed thumbnail image. The browser page has a link to another window to open a corresponding display image having a greater size, in response to a click of a thumbnail image selected among the displayed thumbnail images. The acquaintance (receiver) clicks a selected thumbnail image to see a display image of the greater size.

Figure 14:
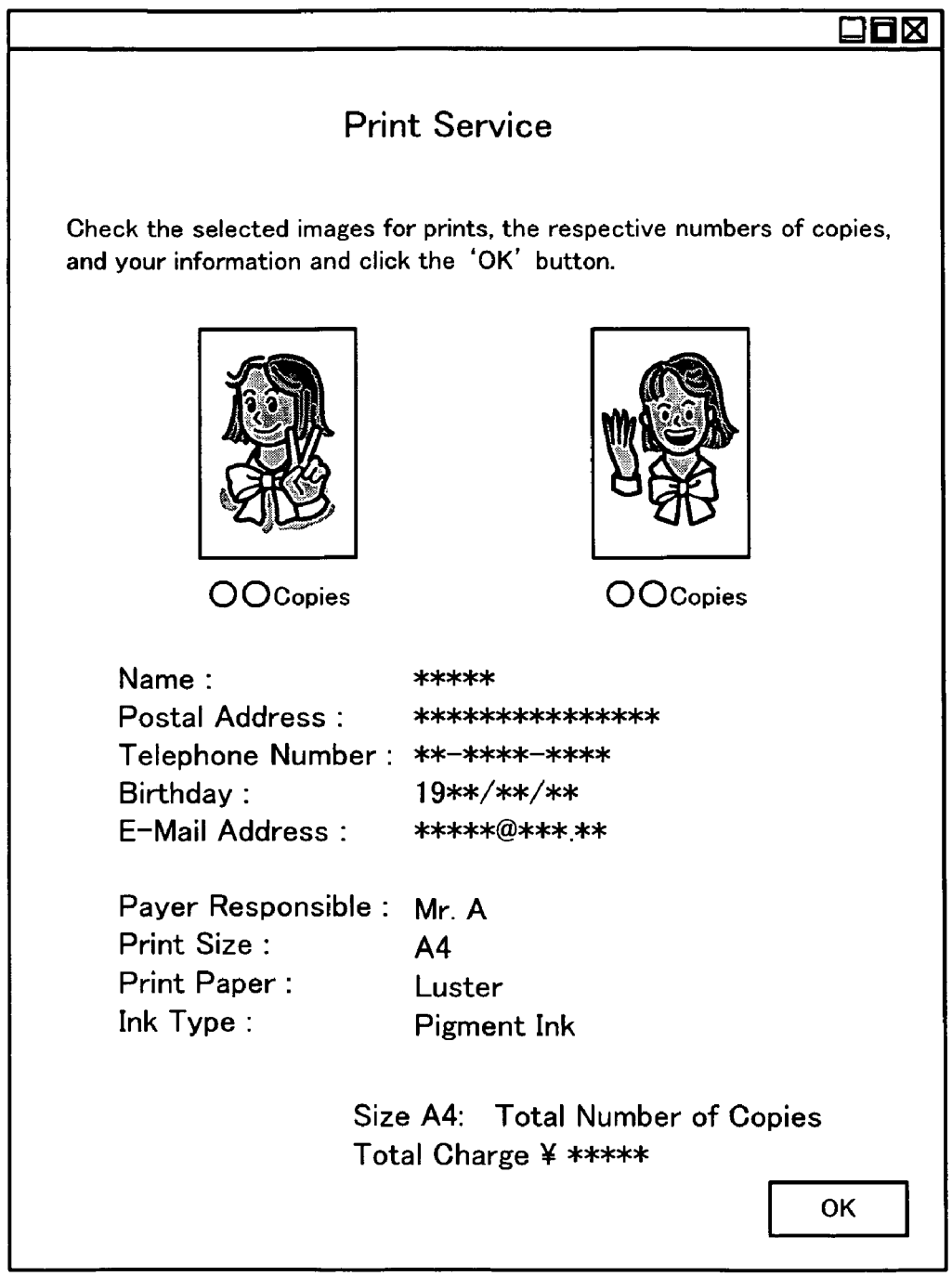
FIG. 14 shows an example of an order confirmation window.

The acquaintance (receiver) enters a required number of copies in the input box immediately below each thumbnail image on this browser page and clicks an 'Order' button to access a print service. In response to the acquaintance's (receiver's) click of the 'Order' button, the print management device 30 inputs the image ID of each selected thumbnail image with the entry of the required number of copies (step S220) and calculates the total charge for printing the selected images (step S230). A concrete procedure of accounting refers to the charge table shown in FIG. 6 and calculates the total charge from the input image IDs, the input numbers of copies, and the printing conditions included in the registration management information. The routine subsequently sends and opens an identification entry window to and on the acquaintance's (receiver's) computer 60 for delivery of resulting prints and identification as shown in FIG. 13, and requests the acquaintance (receiver) to enter the name, the postal address, the telephone number, the birthday, and the e-mail address (step S240). In response to a click of a 'Next' button after entry of these required data, an order confirmation window is sent to and opens on the acquaintance's (receiver's) computer 60 as shown in FIG. 14 (step S250). The order confirmation window includes selected thumbnail images, the respective numbers of copies, and the information entered in the identification entry window (the name, the postal address, the telephone number, the birthday, and the e-mail address), the payer responsible, the printing conditions, and the calculated total charge. In response to the acquaintance's (receiver's) click of an 'OK' button on this order confirmation window, the routine sets the entries to order entry information (step S260), allocates an order ID to the order entry information and registers the order entry information with the allocated order ID as the order information into the database in the hard disk unit 36 (step S270), and registers the allocated order ID in the corresponding registration management information (step S280) One example of the order entry information is shown in FIG. 15. The order entry information has similar data structure to that of the order information described previously (see FIG. 5).

Figure 16:
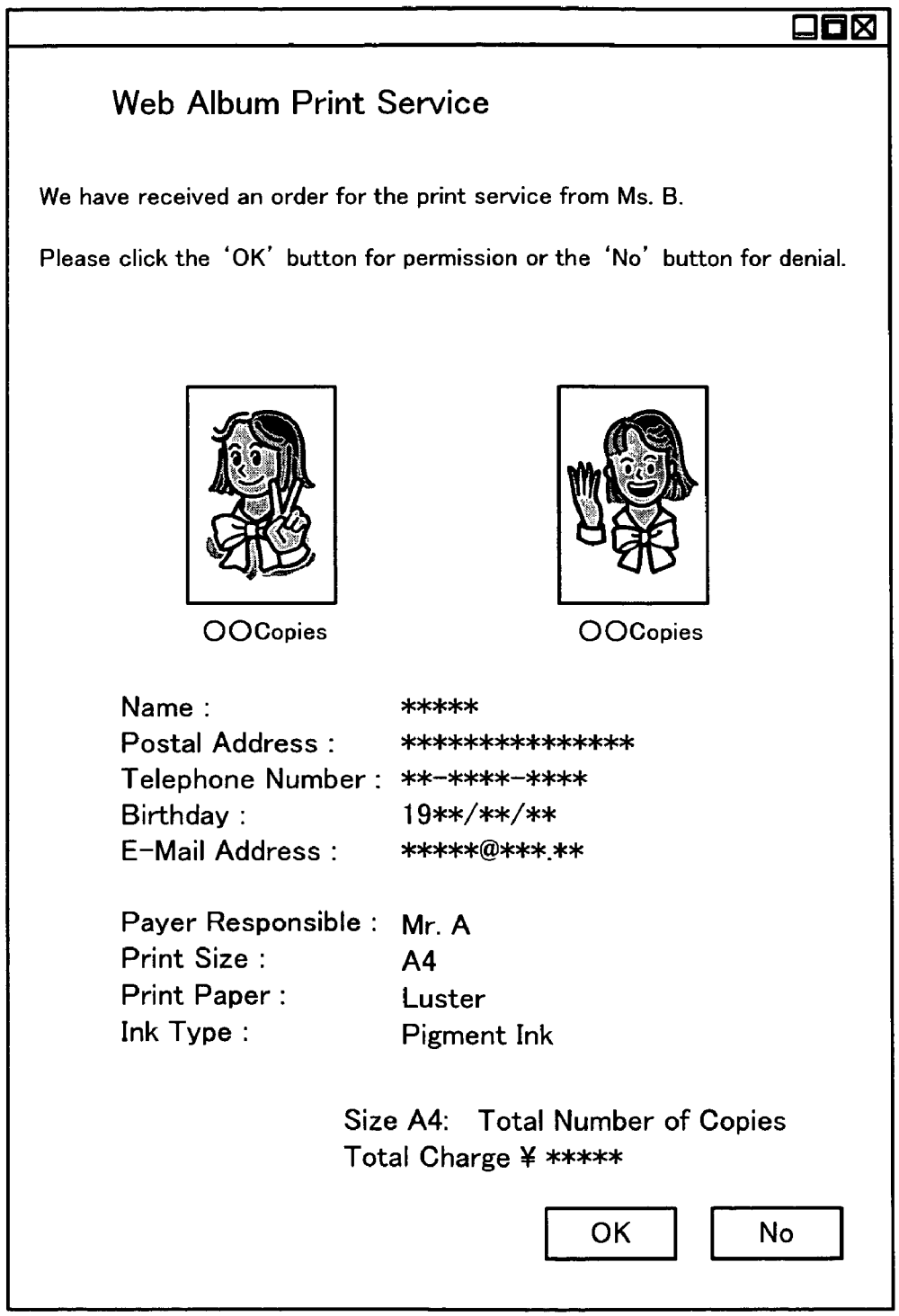
FIG. 16 shows an example of the follow-up e-mail to a user.

After registration of the order information, the routine prepares a follow-up e-mail based on the registered order information (step S290) and sends the follow-up e-mail to the user with the e-mail address included in the registration management information corresponding to the registered order information (step S295). The browse and order routine is here terminated. One example of the follow-up e-mail is shown in FIG. 16. The follow-up e-mail includes thumbnail images corresponding to object images to be printed, the respective numbers of copies, the name, the postal address, the telephone number, the birthday, and the e-mail address of the acquaintance (receiver) who has given the order, the payer responsible, the printing conditions, and the calculated total charge. The follow-up e-mail also includes an 'OK' button for permission and a 'No' button for denial on the bottom. The 'OK' button and the 'No' button have links to send the permission/denial information and the order ID to the print management device 30. The user receives the follow-up e-mail, checks the specifications in the follow-up e-mail, and selects either the 'OK' button for permission to the print service or the 'No' button for denial of the print service. The user's simple click of the 'OK' button or the 'No' button instructs the print management device 30 to permit or deny the print service with the specified order ID.

Figure 17:
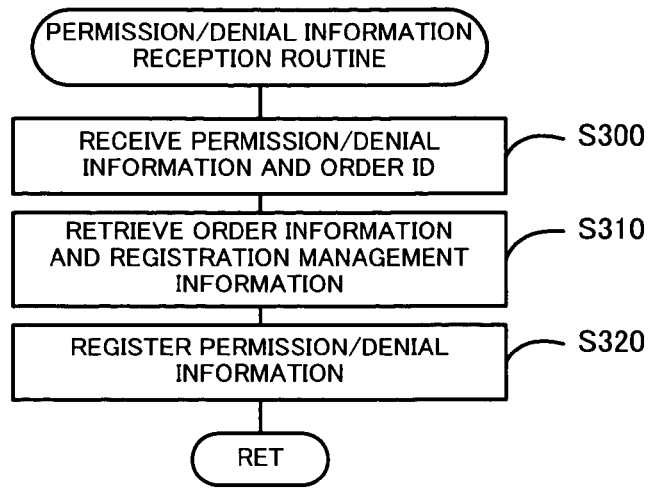
FIG. 17 is a flowchart showing a permission/denial information reception routine.

In response to transmission of the information on permission or denial of the print service (permission/denial information) and the order ID from the user's computer 50 to the print management device 30, the print management device 30 functions as the permission/denial information reception module 34f to execute a permission/denial information reception routine shown in the flowchart of FIG. 17. The permission/denial information reception routine receives the permission/denial information and the order ID sent from the user's computer 50 (step S300), and retrieves the order information and the registration management information with the received order ID as a key (step S310). The permission/denial information reception routine registers the received permission/denial information into the retrieved order information and registration management information (step S320), before being terminated. This process registers the permission/denial information in the order information and the registration management information.

Figure 18:
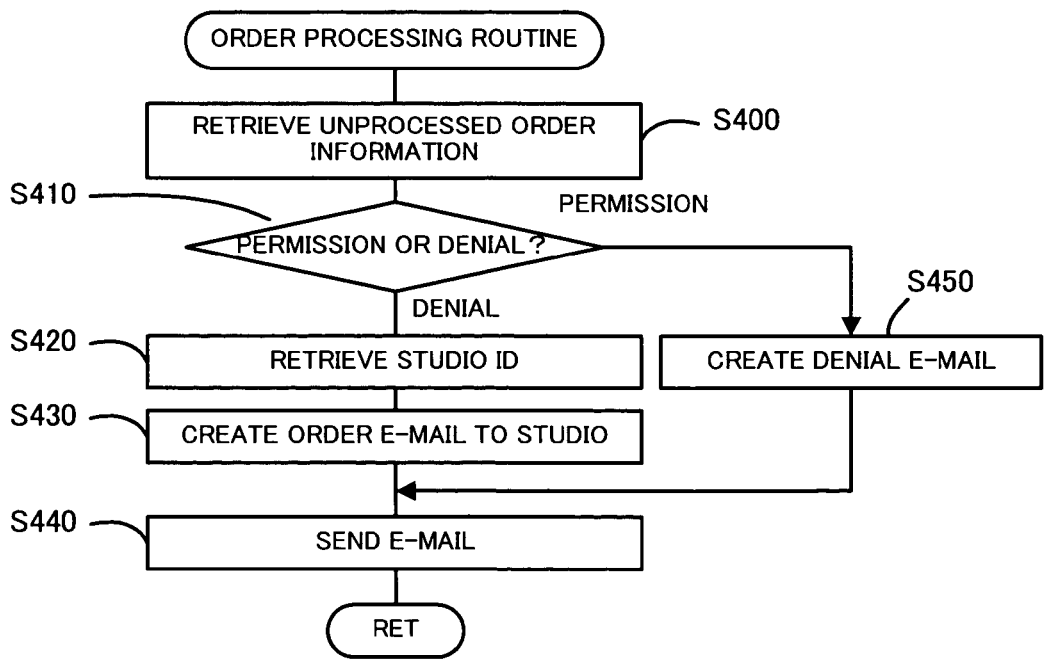
FIG. 18 is a flowchart showing an order processing routine.
Figure 19:
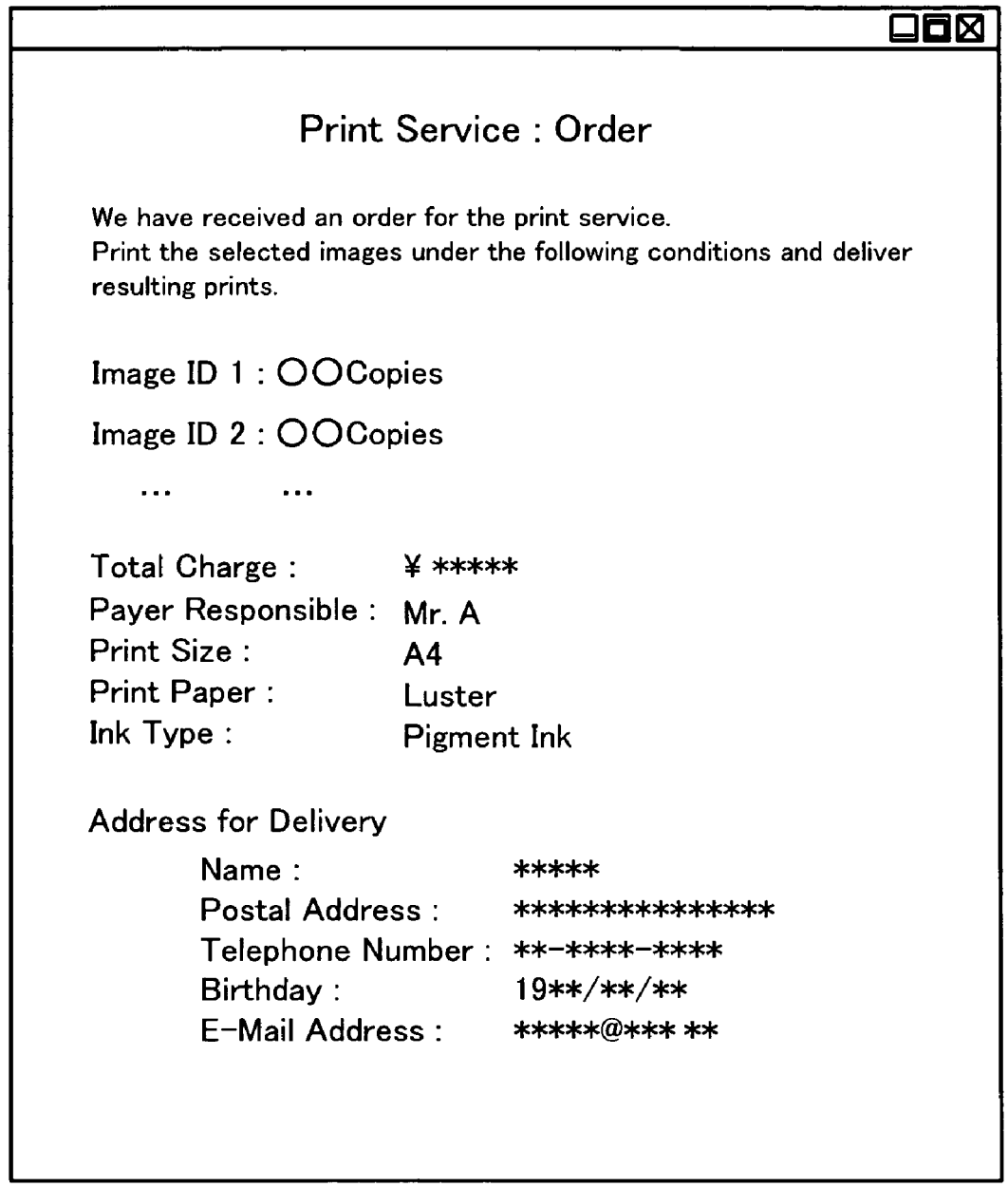
FIG. 19 shows an example of the order e-mail to a studio.

The print management device 30 of the embodiment functions as the order processing module 34g at preset time intervals (for example, at every 24 hours) to execute an order processing routine shown in the flowchart of FIG. 18. The order processing routine first retrieves unprocessed order information (step S400) and checks the permission/denial information included in the retrieved unprocessed order information (step S410). When the permission/denial information specifies 'permission', the routine retrieves the registration management information with the order ID of the retrieved unprocessed order information as a key to obtain a corresponding studio ID from the retrieved registration management information (step S420). The routine then creates an order e-mail to the studio, which describes the order information (step S430) and sends the order e-mail to the photo studio with the e-mail address included in the studio information corresponding to the obtained studio ID (step S440). The order processing routine is here terminated. One example of the order e-mail to the studio is shown in FIG. 19. The photo studio receives the order e-mail, prints selected images under the printing conditions described in the received order e-mail, and delivers resulting prints to the postal address described in the order e-mail. When the user's acquaintance (the receiver) is selected as the payer responsible, the photo studio charges the acquaintance (receiver) for resulting prints at the delivery.

Figure 20:
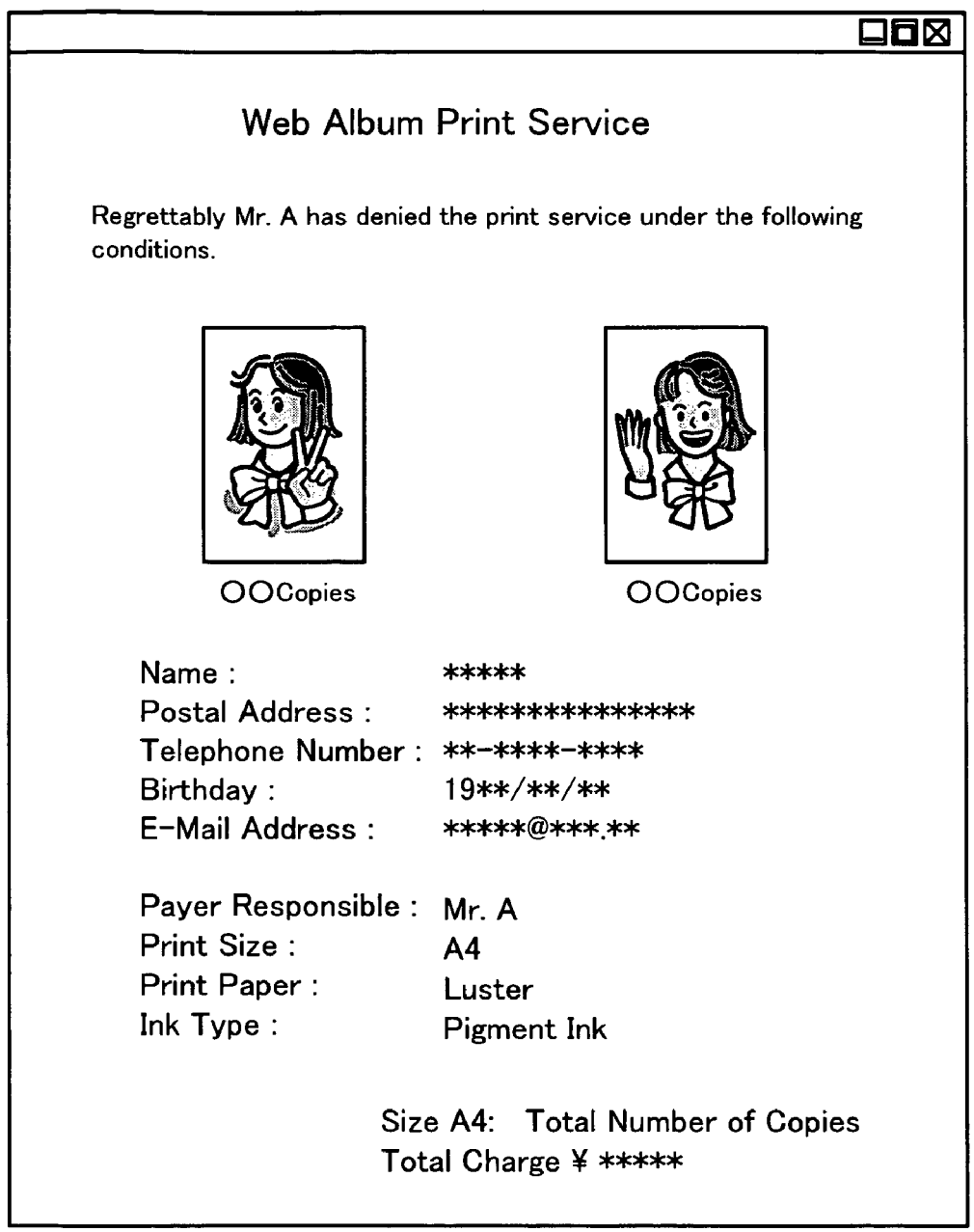
FIG. 20 shows an example of the denial e-mail.

When the permission/denial information specifies 'denial', on the other hand, the order processing routine creates a denial e-mail representing denial of the print service (step S450) and sends the denial e-mail to the acquaintance (receiver) with the mail address included in the order information (step S440), before being terminated. One example of the denial e-mail is shown in FIG. 20. The acquaintance (receiver) who has given the order for the print service is thus notified of the user's denial of the order.

Figure 21:
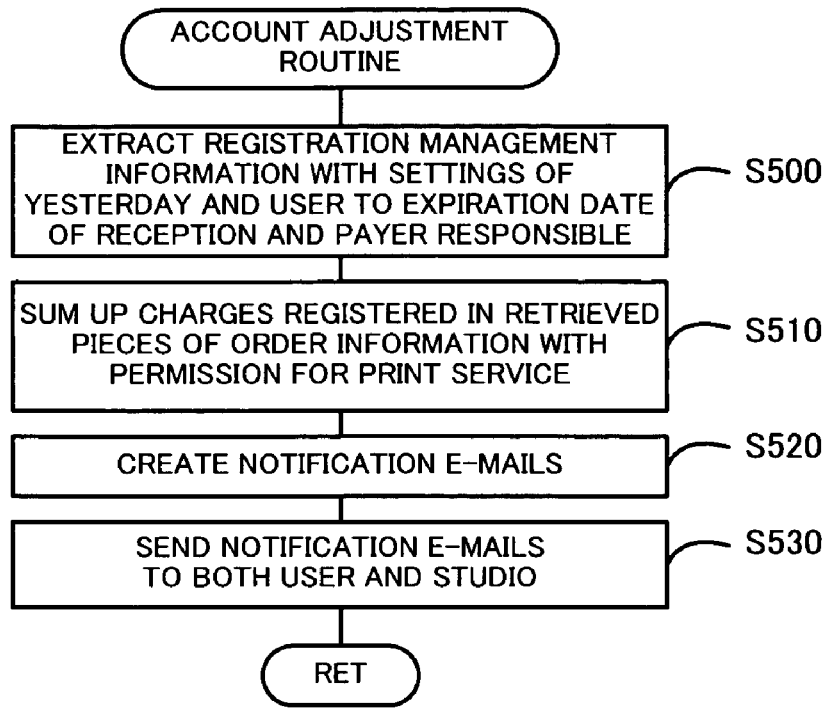
FIG. 21 is a flowchart showing an account adjustment routine.
Figure 22:
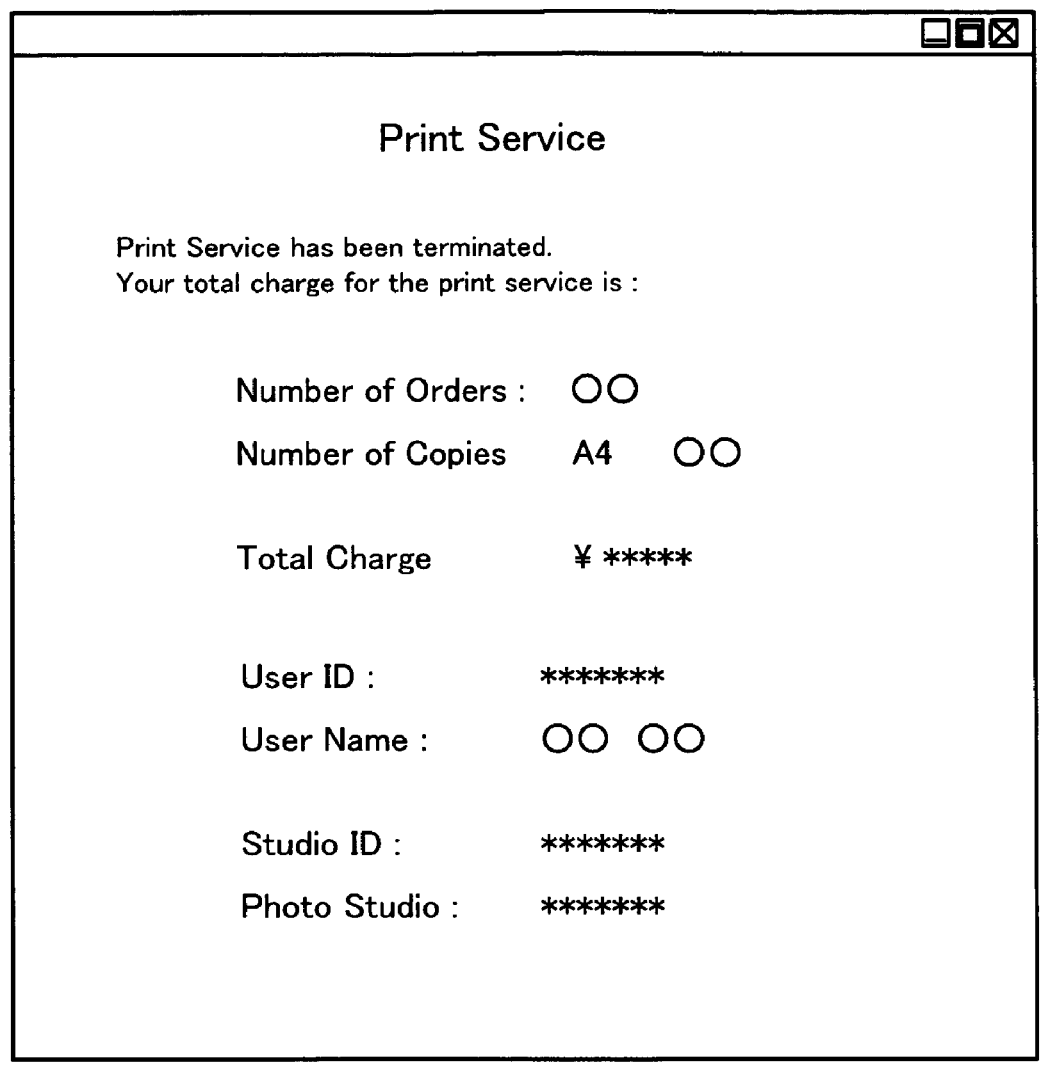
FIG. 22 shows an example of the notification e-mail.

The print management device 30 of the embodiment functions as the accounting module 34h at preset time intervals (for example, at every 24 hours) to execute an account adjustment routine shown in the flowchart of FIG. 21. The account adjustment routine first extracts pieces of the registration management information, in which yesterday has been set to the expiration date of reception and the user has been selected as the payer responsible (step S500). The routine then sums up the charges for the print service with respect to each of the extracted pieces of the registration management information (step S510). A concrete procedure retrieves pieces of the order information with order IDs having the setting of 'permission' to the permission/denial information registered in the registration management information, and sums up the charges registered in the retrieved pieces of the order information. The routine creates notification e-mails including the total charge (step S520). The account adjustment routine terminates, after sending the notification e-mails to both the user with the e-mail address included in the user information corresponding to the user ID registered in the registration management information and the photo studio with the e-mail address included in the studio information corresponding to the studio ID registered in the registration management information (step S530). One example of the notification e-mail is shown in FIG. 22. The photo studio receives the notification e-mail and charges the user for the print service.

As described above, the print management device 30 of the embodiment sends the e-mails including the print permission password and the receiver ID to only the receivers specified by the user and registered in the registration management information. This arrangement effectively prevents general public from accessing the images and the print service. The user is asked to permit or deny each order for the print service. This desirably restrains images from being printed against the user's intention. The print management device 30 does not download the original images, while storing only the thumbnail images and the display images corresponding to the original images. This arrangement effectively restrains the potential trouble of making a large number of unauthorized prints of downloaded images, against the user's intention. Previous selection of the payer responsible assures the adequate adjustment of the account for the print service. The printing conditions of the images have also been set in advance. Such setting desirably prevents the images from being printed under the printing conditions against the user's intention.

In the print management device 30 of the embodiment, the hard disk unit 36 corresponds to an information storage module, and the information transmitter receiver module 32 corresponds to an information transmitter receiver module of the invention. In the print management device 30 of the embodiment, the non-illustrated CPU which functions as the registration information reception module 34a and executes the steps S100 to S140 in the registration distribution routine show in FIG. 7 corresponds to a registration information reception control module of the invention, the CPU which functions as the permission information distribution module 34b and execute the steps S150 and S160 in the registration distribution routine corresponds to a specific person-only information delivery control module of the invention. Similarly, the CPU which functions as the browse processing module 34c and executes the steps S200 and S210 in the browse and order routine shown in FIG. 11 corresponds to a thumbnail image transmission control module, the CPU which functions as the order information reception module 34d and executes the steps S220 to S280 in the browse and order routine corresponds to an order information reception control module of the invention, and the CPU which functions as the order information delivery module 34e and executes the steps S290 and S295 in the browse and order routine corresponds to an order information delivery control module of the invention.

Further in the print management device 30 of the embodiment, the CPU which functions as the permission/denial information reception module 34f and executes the permission/denial information reception routine shown in FIG. 17 corresponds to a permission/denial information reception control module of the invention, the CPU which functions as the order processing module 34g and executes the order processing routine shown in FIG. 18 corresponds to an order processing module of the invention, and the CPU which functions as the accounting module 34h and executes the accounting adjustment routine corresponds to an accounting module of the invention.

The print management device 30 of the embodiment receives the registration information, which is entered into and sent from the printing apparatus 40 installed at the photo studio. The print management device 30 may alternatively receive the registration information, which is entered into and sent from the user's computer 50.

The print management device 30 of the embodiment inputs the registration information for storage, together with the thumbnail images and the display images corresponding to the object images of the print service. The registration information may alternatively be input only with the thumbnail images.

The print management device 30 of the embodiment sends the e-mails including the address (URL) for browsing thumbnail images and the print permission password to the specified acquaintances (receivers). Any other suitable technique may be applied to notify the specified acquaintances (receivers) of the address (URL) and the print permission password. The print management device 30 of the embodiment sends the follow-up e-mail to notify the user of the acquaintance's (receiver's) order for the print service, the order e-mail to the studio to notify the photo studio of the order for the print service, the denial e-mail to notify the acquaintance (receiver) of the user's denial of the order for the print service, and the notification e-mail to notify the user and the photo studio of the total charge. Any other suitable technique may also be applied to attain the respective purposes.

The print management device 30 of the embodiment uses the registration management information that includes the printing conditions. The printing conditions may, however, be set with respect to each image or may not be specified at all. Another possible modification provides multiple options of printing conditions and allows each acquaintance (receiver) to select desired options of printing conditions. The desired options of printing conditions may be selected with respect to each image.

The print management device 30 of the embodiment uses the registration management information that includes the specification of the payer responsible. The registration management information may alternatively not include the specification of the payer responsible. In this case, the user may unconditionally be set to the payer responsible for all the charges for the print service, or the respective acquaintances (receivers) who access the print service may unconditionally be set to the payer responsible.

The print management device 30 of the embodiment calculates the total charge for the print service and adjusts the account. The print management device 30 may, however, not have the accounting and account adjustment functions. In this case, the account may be settled according to a contract between the photo studio and each user.

In the system of the above embodiment, one single computer works as the print management device 30. The print management device 30 may, however, alternatively include multiple computers. In the latter system, multiple computers may be located at an identical position or at multiple different positions.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A print management device that manages printing of an image, said print management device comprising:

an information storage module that stores information;

an information transmitter receiver module that transmits and receives information via a network;

a registration information reception control module that controls said information transmitter receiver module to receive registration information from a computer connecting with the network and stores the received registration information into said information storage module, where the registration information includes user identification information for identifying a user, user contact information regarding a contact point of the user, at least one thumbnail image, printing apparatus contact information regarding a contact point of a printing apparatus, which stores an original image corresponding to each of the at least one thumbnail image and is capable of printing the original image, and specific person contact information regarding a contact point of a specific person who receives permission to print the original image corresponding to each of the at least one thumbnail image;

a specific person-only information delivery control module that controls said information transmitter receiver module to transmit specific person-only information to the contact point of the specific person specified according to the specific person contact information included in the registration information stored at a preset timing in said information storage module, where the specific person-only information includes address information that is used by the specific person via a computer to browse the at least one thumbnail image included in the registration information, and permission information that permits the specific person to browse the at least one thumbnail image and print the original image corresponding to each of the at least one thumbnail image;

a thumbnail image transmission control module that receives a browsing request of at least one thumbnail image in relation to the transmitted address information and permission information from another computer connecting with the network, reads the at least one thumbnail image in relation to the address information from said information storage module, and controls said information transmitter receiver module to transmit the at least one read-out thumbnail image, which is to be displayed on the another computer;

an order information reception control module that controls said information transmitter receiver module to receive print order information and stores the received print order information in relation to corresponding registration information into said information storage module, where the print order information includes selection information regarding an object image to be printed, which is selected among the at least one transmitted thumbnail image and input from the another computer, and specific person identification information for identifying the specific person;

an order information delivery control module that reads the registration information stored at the preset timing in said information storage module and the print order information in relation to the registration information from said information storage module, and controls said information transmitter receiver module to transmit the read-out print order information to the contact point of the user specified by the user contact information included in the read-out registration information;

a permission/denial information reception control module that controls said information transmitter receiver module to receive permission/denial information regarding permission or denial of a print order with respect to the transmitted print order information from the user's computer connecting with the network, and stores the received permission/denial information in relation to the corresponding registration information into said information storage module; and an order processing module that reads the registration information stored at the preset timing in said information storage module, as well as the print order information and the permission/denial information in relation to the registration information, from said information storage module, and controls said information transmitter receiver module, in response to setting of print permission in the read-out permission/denial information, to transmit the print order information to the contact point of the printing apparatus specified by the printing apparatus contact information included in the registration information, while controlling said information transmitter receiver module, in response to setting of print denial in the read-out permission/denial information, to transmit print denial information including denial of the print order and display of the object image in the denial of the print order to the contact point of the specific person identified by the specific person identification information included in the print order information, wherein said registration information reception control module receives, as part of the registration information, payment responsible information which regards a payer responsible and is set in response to selection of either of the user and the specific person with the print order to pay for printing the object image, and said print management device further comprises an accounting execution module that, in response to setting of the user to the payer responsible in the payment responsible information, sums up a total charge payable by the user and adjusts an account for the user at a predetermined second timing so as to execute accounting for printing of the object image, while in response to setting of the specific person with the print order to the payer responsible in the payment responsible information, adjusts an account for the specific person, who is identified by the specific person identification information included in the print order information with setting of print permission in the permission/denial information received by said permission/denial information reception control module, so as to execute accounting for printing of the object image.

2. A print management device in accordance with claim 1, wherein said accounting execution module controls said information transmitter receiver module to transmit a result of the accounting to a contact point of an object person selected as the payer responsible.

3. A print management device in accordance with claim 1, wherein said thumbnail image transmission control module reads the payment responsible information from said information storage module and transmits the read-out payment responsible information, together with the at least one thumbnail image.

4. A print management device in accordance with claim 1, wherein said order information reception control module receives printing condition information including a required number of copies and a print size with regard to the object image to be printed, as part of the print order information, and
said accounting execution module executes accounting, based on the printing condition information.

5. A print management device in accordance with claim 1, wherein said registration information reception control module receives printing condition information including at least one of a printing paper size, a printing paper type, and an ink type used for printing the original image, as part of the registration information, and
said thumbnail image transmission control module reads the printing condition information from said information storage module and transmits the read-out printing condition information, together with the at least one thumbnail image, to be displayed on the another computer.

6. A print management device in accordance with claim 5, wherein said registration information reception control module receives the printing condition information including multiple options of the printing paper size used for printing the original image, as part of the registration information,
said thumbnail image transmission control module reads the printing condition information from said information storage module and transmits the read-out printing condition information, together with the at least one thumbnail image, to be displayed on the another computer, and
said order information reception control module receives a selected option of the printing paper size used for printing the original image, as part of the print order information.

7. A print management device in accordance with claim 1, wherein the specific person contact information is an e-mail address of the specific person, and
said specific person-only information delivery control module creates an e-mail describing the specific person-only information and sends the e-mail.

8. A print management device in accordance with claim 1, wherein the user contact information is an e-mail address of the user, and
said order information delivery control module creates an e-mail describing the read-out print order information and sends the e-mail.

9. A print management device in accordance with claim 1, wherein said registration information reception control module receives at least one display image, which corresponds to the at least one thumbnail image and has a greater size than a size of the thumbnail image, as part of the registration information, and
said thumbnail image transmission control module, in response to selection of a desired thumbnail image on the another computer, reads a display image corresponding to the selected thumbnail image from said information storage module, and controls said information transmitter receiver module to transmit the display image, which is to be displayed on the another computer.

10. A print management device in accordance with claim 1, wherein said order information reception control module receives information including at least one of postal address, birthday, and telephone number, in addition to name of the specific person as the specific person identification information and stores the received specific person identification information into said information storage module.

11. A print management method that causes a computer to manage printing of an image, said computer comprising an information storage module that stores information, and an information transmitter receiver module that transmits and receives information via a network, said print management method comprising the steps of:
(a) controlling said information transmitter receiver module to receive registration information from a computer connecting with the network and storing the received registration information into said information storage module, where the registration information includes user identification information for identifying a user, user contact information regarding a contact point of the user, at least one thumbnail image, printing apparatus contact information regarding a contact point of a printing apparatus, which stores an original image corresponding to each of the at least one thumbnail image and is capable of printing the original image, and specific person contact information regarding a contact point of a specific person who receives permission to print the original image corresponding to each of the at least one thumbnail image;
(b) controlling said information transmitter receiver module to transmit specific person-only information to the contact point of the specific person specified according to the specific person contact information included in the registration information stored at a preset timing in said information storage module, where the specific person-only information includes address information that is used by the specific person via a computer to browse the at least one thumbnail image included in the registration information, and permission information that permits the specific person to browse the at least one thumbnail image and print the original image corresponding to each of the at least one thumbnail image;
(c) receiving a browsing request of at least one thumbnail image in relation to the transmitted address information and permission information from another computer connecting with the network, reading the at least one thumbnail image in relation to the address information from said information storage module, and controlling said information transmitter receiver module to transmit the at least one read-out thumbnail image, which is to be displayed on the another computer;
(d) controlling said information transmitter receiver module to receive print order information and storing the received print order information in relation to corresponding registration information into said information storage module, where the print order information includes selection information regarding an object image to be printed, which is selected among the at least one transmitted thumbnail image and input from the another computer, and specific person identification information for identifying the specific person;
(e) reading the registration information stored at the preset timing in said information storage module and the print order information in relation to the registration information from said information storage module, and controlling said information transmitter receiver module to transmit the read-out print order information to the contact point of the user specified by the user contact information included in the read-out registration information;

(f) controlling said information transmitter receiver module to receive permission/denial information regarding permission or denial of a print order with respect to the transmitted print order information from the user's computer connecting with the network, and storing the received permission/denial information in relation to the corresponding registration information into said information storage module; and (g) reading the registration information stored at the preset timing in said information storage module, as well as the print order information and the permission/denial information in relation to the registration information, from said information storage module, and controlling said information transmitter receiver module, in response to setting of print permission in the read-out permission/denial information, to transmit the print order information to the contact point of the printing apparatus specified by the printing apparatus contact information included in the registration information, while controlling said information transmitter receiver module, in response to setting of print denial in the read-out permission/denial information, to transmit print denial information including denial of the print order and display of the object image in the denial of the print order to the contact point of the specific person identified by the specific person identification information included in the print order information, wherein said step (a) includes controlling said information transmitter receiver module to receive, as part of the registration information, payment responsible information which regards a payer responsible and is set in response to selection of either of the user and the specific person with the print order to pay for printing the object image, and said print management method further comprises, in response to setting of the user to the payer responsible in the payment responsible information, summing up a total charge payable by the user and adjusting an account for the user at a predetermined second timing so as to execute accounting for printing of the object image, while in response to setting of the specific person with the print order to the payer responsible in the payment responsible information, adjusting an account for the specific person, who is identified by the specific person identification information included in the print order information with setting of print permission in the permission/denial information received in said step (f), so as to execute accounting for printing of the object image.

12. A storage medium that stores a program installable in a computer, the computer including an information storage module that stores information and an information transmitter receiver module that transmits and receives information via a network, said program comprising:

(a) a module of controlling said information transmitter receiver module to receive registration information from a computer connecting with the network and storing the received registration information into said information storage module, where the registration information includes user identification information for identifying a user, user contact information regarding a contact point of the user, at least one thumbnail image, printing apparatus contact information regarding a contact point of a printing apparatus, which stores an original image corresponding to each of the at least one thumbnail image and is capable of printing the original image, and specific person contact information regarding a contact point of a specific person who receives permission to print the original image corresponding to each of the at least one thumbnail image;

(b) a module of controlling said information transmitter receiver module to transmit specific person-only information to the contact point of the specific person specified according to the specific person contact information included in the registration information stored at a preset timing in said information storage module, where the specific person-only information includes address information that is used by the specific person via a computer to browse the at least one thumbnail image included in the registration information, and permission information that permits the specific person to browse the at least one thumbnail image and print the original image corresponding to each of the at least one thumbnail image;

(c) a module of receiving a browsing request of at least one thumbnail image in relation to the transmitted address information and permission information from another computer connecting with the network, reading the at least one thumbnail image in relation to the address information from said information storage module, and controlling said information transmitter receiver module to transmit the at least one read-out thumbnail image, which is to be displayed on the another computer;

(d) a module of controlling said information transmitter receiver module to receive print order information and stores the received print order information in relation to corresponding registration information into said information storage module, where the print order information includes selection information regarding an object image to be printed, which is selected among the at least one transmitted thumbnail image and input from the another computer, and specific person identification information for identifying the specific person;

(e) a module of reading the registration information stored at the preset timing in said information storage module and the print order information in relation to the registration information from said information storage module, and controlling said information transmitter receiver module to transmit the read-out print order information to the contact point of the user specified by the user contact information included in the read-out registration information;

(f) a module of controlling said information transmitter receiver module to receive permission/denial information regarding permission or denial of a print order with respect to the transmitted print order information from the user's computer connecting with the network, and storing the received permission/denial information in relation to the corresponding registration information into said information storage module; and (g) a module of reading the registration information stored at the preset timing in said information storage module, as well as the print order information and the permission/denial information in relation to the registration information, from said information storage module, and controlling said information transmitter receiver module, in response to setting of print permission in the read-out permission/denial information, to transmit the print order information to the contact point of the printing apparatus specified by the printing apparatus contact information included in the registration information, while controlling said information transmitter receiver module, in response to setting of print denial in the read-out permission/denial information, to transmit print denial information including denial of the print order and display of the object image in the denial of the print order to the contact point of the specific person identified by the specific person identification information included in the print order information, wherein module (a) includes controlling said information transmitter receiver module to receive, as part of the registration information, payment responsible information which regards a payer responsible and is set in response to selection of either of the user and the specific person with the print order to pay for printing the object image, and said program further comprises a module that, in response to setting of the user to the payer responsible in the payment responsible information, sums up a total charge payable by the user and adjusts an account for the user at a predetermined second timing so as to execute accounting for printing of the object image, while in response to setting of the specific person with the print order to the payer responsible in the payment responsible information, adjusts an account for the specific person, who is identified by the specific person identification information included in the print order information with setting of print permission in the permission/denial information received in module (f), so as to execute accounting for printing of the object image.

\* \* \* \* \*